United States Patent

[11] 3,629,008

[72] Inventors Willard T. Grubb
 Schenectady, N.Y.;
 Carl E. Cliche, Peabody, Mass.
[21] Appl. No. 725,989
[22] Filed May 2, 1968
[45] Patented Dec. 21, 1971
[73] Assignee General Electric Company

[54] COMPOSITE ELECTRODE AND ELECTROCHEMICAL CELL WITH AT LEAST ONE GAS DIFFUSION ELECTRODE
6 Claims, 1 Drawing Fig.

[52] U.S. Cl. .................................................. 136/86, 136/120, 136/121, 136/122, 136/167
[51] Int. Cl. .................................................. H01m 27/04, H01m 13/02, H01m 1/02
[50] Field of Search ...................................... 136/86, 120, 121, 167

[56] References Cited
UNITED STATES PATENTS

| | | | |
|---|---|---|---|
| 2,641,623 | 6/1953 | Winckler et al. | 136/86 UX |
| 3,202,546 | 8/1965 | Rightmire et al. | 136/86 |
| 3,258,415 | 6/1966 | Kordesch | 136/86 X |
| 3,096,218 | 7/1963 | Lieb et al. | 136/121 |
| 3,343,995 | 9/1967 | Reid et al. | 136/121 |
| 3,377,204 | 4/1968 | Mather, Jr. et al. | 136/122 |
| 3,395,049 | 7/1968 | Thompson | 136/122 |
| 3,077,507 | 2/1963 | Kordesch et al. | 136/86 |
| 3,097,116 | 7/1963 | Moos | 136/86 |
| 3,276,909 | 10/1966 | Moos | 136/86 |
| 3,284,238 | 11/1966 | White | 136/86 |
| 3,350,232 | 10/1967 | Ryhiner et al. | 136/86 |
| 3,379,635 | 4/1968 | Von Doehren et al. | 136/120 FC X |
| 3,391,028 | 7/1968 | Vose | 136/86 |
| 3,442,715 | 5/1969 | Yee et al. | 136/86 |

FOREIGN PATENTS

| | | | |
|---|---|---|---|
| 233,847 | 9/1959 | Australia | 136/86 |

*Primary Examiner*—Allen B. Curtis
*Attorneys*—Richard R. Brainard, Paul A. Frank, Charles T. Watts, Paul R. Webb, II, Frank L. Neuhauser, Oscar B. Waddell and Melvin M. Goldenberg ABSTRACT: A composite gas diffusion electrode has an electrode body, at least one water-soluble polymeric thickening or gelling agent swellable in an aqueous electrolyte, and a layer of the thickening agent adhering to and covering at least a portion of one of the surfaces of the electrode body. Upon subsequent use in contact with an aqueous electrolyte, the thickening agent swells on the covered surface of the electrode body preventing electrolyte leakage therethrough, preventing drowning of the electrode, reducing loss of any dissolved fuel in the electrolyte, and immobilizing at least partially the electrolyte. Additionally, an electrochemical cell with at least one gas diffusion electrode has the above type of thickening agent covering various portions of the interior structure of the cell. Upon subsequent use in contact with an aqueous electrolyte, the thickening agent swells on covered portions of the interior structure preventing electrolyte leakage therethrough, and immobilizing at least partially the electrolyte.

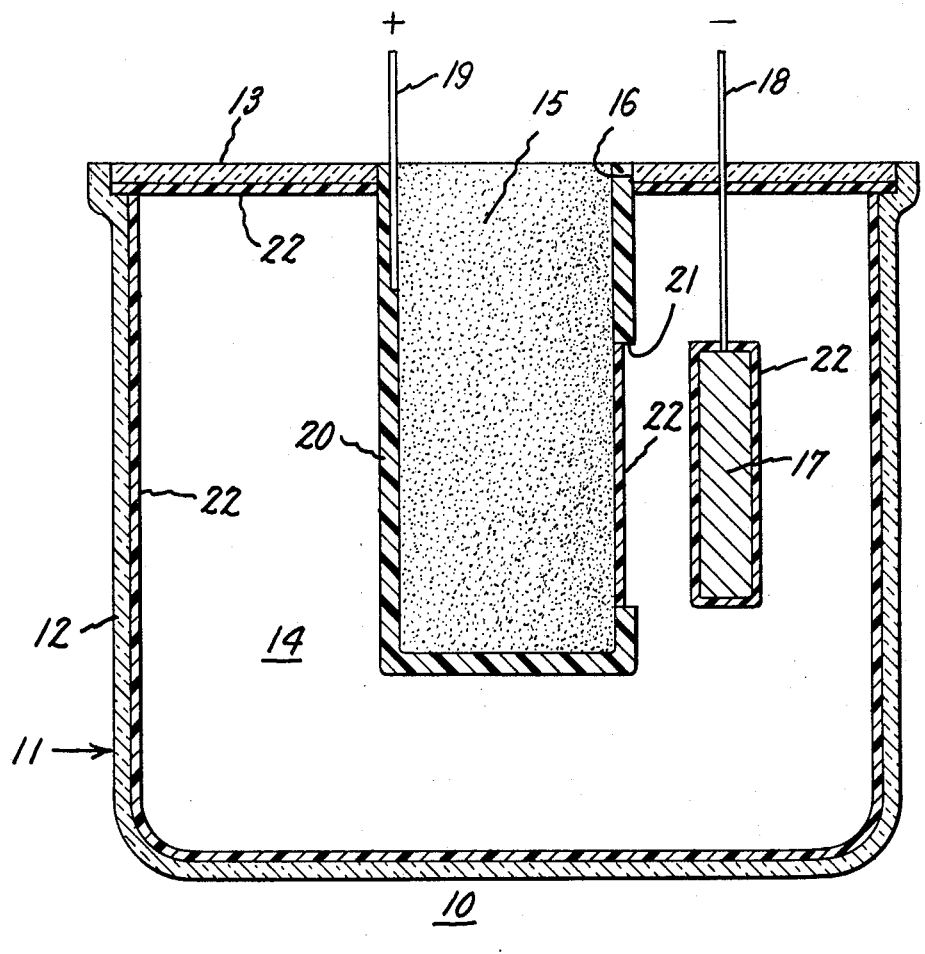
Inventors:
Willard T. Grubb,
Carl E. Cliche,
by Paul R. Webb, II
Their Attorney.

3,629,008

COMPOSITE ELECTRODE AND ELECTROCHEMICAL CELL WITH AT LEAST ONE GAS DIFFUSION ELECTRODE

This invention relates to composite gas diffusion electrodes, electrochemical cells with at least one gas diffusion electrode, and to methods of making such composite gas diffusion electrodes and electrochemical cells and, more particularly, to such composite gas diffusion electrodes with at least one water-soluble polymeric thickening agent swellable in an aqueous electrolyte in a layer adhering to and covering at least a portion of one of the surfaces of the electrode body, to electrochemical cells with such thickening agent covering at least a portion of the interior structure thereof, and to methods of making such composite gas diffusion electrodes and cells with the above type of thickening agent. Upon subsequent use in contact with an aqueous electrolyte, the thickening agent swells on the covered portions preventing electrolyte leakage therethrough, and immobilizing at least partially the electrolyte. When the composite gas diffusion electrode is employed subsequently as a cathode in contact with the electrolyte, drowning of the electrode is prevented, and loss of any dissolved duel is reduced.

An electrochemical cell with at least one gas diffusion electrode when employed as a fuel cell having an aqueous alkaline electrolyte with a soluble fuel dissolved therein, contains an anode in contact with the electrolyte that is capable of electrocatalytically oxidizing a fuel, such as an alcohol. The cathode is a porous, gas diffusion electrode which forms a barrier between the electrolyte and the oxidant, usually air. The cathode is provided with a surface which is active for the reduction of the oxidant but is catalytically passive to the alcohol or other fuel. In such cells, serious problems are encountered in leakage of the electrolyte from the casing, drowning of the cathode by the electrolyte, and evaporation of the fuel, if volatile.

Our present invention is directed to a composite gas diffusion electrode which has an electrode body, a water-soluble polymeric thickening agent swellable in an aqueous electrolyte, and a layer of thickening agent adhering to and covering at least a portion of one of the surfaces of the electrode body. Additionally, our invention is directed to electrochemical cells with at least one gas diffusion electrode in which such a thickening agent covers at least a portion of one of the surfaces of the interior structure. In our improved electrochemical cell, the above problems of electrolyte leakage, drowning of the cathode, and loss of fuel are eliminated or substantially reduced. Further, our novel methods of forming improved composite gas diffusion electrode structures with such a thickening agent and electrochemical cells with such a thickening agent covering at least a portion of the interior structure thereof result in composite gas diffusion electrodes and electrochemical cells which are ready for operation by merely filling the cell chamber with electrolyte and fuel, and sealing readily the cover to the body portion of the casing.

It is a primary object of our invention to provide an improved composite gas diffusion electrode which eliminates or substantially reduces the subsequent leakage of electrolyte therethrough when employed in an electrochemical cell.

It is another object of our invention to provide an improved electrochemical cell which eliminates or substantially reduces leakage of the electrolyte therefrom.

It is a further object of our invention to provide an improved method of making electrodes and electrochemical cells.

In accordance with one aspect of our invention, a composite gas diffusion electrode has an electrode body, at least one water-soluble polymeric thickening agent swellable in an aqueous electrolyte, and a layer of the thickening agent adhering to and covering at least a portion of one of the surfaces of the electrode body. In accordance with another aspect of our invention, an electrochemical cell with at least one gas diffusion electrode therein has a layer of a similar thickening agent on at least a portion of the interior structure thereof.

These and various other objects, features, and advantages of the invention will be better understood from the following description taken in connection with the accompanying drawing in which:

The single FIGURE is a vertical, sectional view of a fuel cell embodying our invention.

In the single FIGURE of the invention, there is shown generally at 10 an electrochemical cell with at least one gas diffusion electrode embodying our invention, which cell is shown as a fuel cell. Cell 10 has a casing 11 which comprises a body portion 12 with a closed bottom and an open top and a cover portion 13 which fits tightly over the open top of body portion 12. Casing 11 defines a chamber 14 in which there is provided for the operation of the cell a combined alkaline electrolyte such as potassium hydroxide and a dissolved fuel such as methanol. A porous gas diffusion cathode 15 has one end fitted into an aperture 16 in cover 13 of casing 11. In this manner, the upper surface of the cathode is exposed to the atmosphere exterior of casing 11 while the remaining portion of the cathode extends downwardly into chamber 14.

An anode 17 is positioned close to but spaced from cathode 15 within chamber 14. While various suitable arrangements can be employed to support anode 17, there is shown an electrical lead 18 for such support which lead is affixed to anode 17 and extends upwardly through cover 13 of casing 11. Similarly, a lead 19 is shown in contact with cathode 15 and extends outwardly through cover 13 of casing 11. An impervious mask 20 covers or overlies porous cathode 15 except for a portion 21 of its surface which faces or is opposed to anode 17. At least one water-soluble polymer gelling agent 22 is shown covering portion 21 of cathode 15, the exterior surface of anode 17, and the interior of both body portion 12 and cover 13 of casing 11. When the cell is to be operated, a combined alkaline electrolyte such as potassium hydroxide and an alcohol fuel is poured into chamber 14, cover portion 13 is fitted frictionally into the upper open end of body portion 12, and leads 18 and 19 are connected to a suitable electrical load to generate electrical energy from the cell.

The preferred electrolyte and fuel is a mixture of an aqueous alkaline electrolyte and alcohol which is confined or stored in chamber 14. As is well understood in the art, the electrolyte may be aqueous alkali solution of any desired concentration. While the alkali metal hydroxides are the most commonly employed and of the lowest cost, it is appreciated that other soluble hydroxides may be employed, such as tetrasubstituted ammonium or phosphonium hydroxides. As used herein the term "alcohol" includes methanol, ethanol, n-propanol, and isopropanol—that is, any alcohol having from one to three carbon atoms. Methanol is a preferred alcohol on the basis of cost and reactivity. Since the alcohols are miscible with water in all proportions, any desired quantity may be utilized. It is preferred, however, that the relation of hydroxyl ions to alcohol be maintained in a molar ratio that insures that all the alcohol will be consumed during extended operation of the unit. Other fuels are also suitable such as hydrazine, formate, ammonia, ethylene glycol, etc. If desired, a large storage chamber for the electrolyte and fuel can be provided by enlarging chamber 14 beneath the electrodes. In this manner, the alcohol capacity of the cell is increased without in any way penalizing performance of the cell.

The anode electrode is schematically illustrated in the drawing. It may be of any conventional construction or configuration. Anodes capable of efficiently oxidizing alcohol usually include platinum metals or alloys as the electrocatalysts. Alloys of platinum and ruthenium are generally considered most efficient. The electrocatalyst may be employed as a high-area coating on a substrate, suitably bonded into a porous mass or supported on a porous substrate of nickel, carbon, etc.

The porous cathode electrode is formed of a porous electronically conductive mass which, at least at the point where the conductive mass forms an interface with the electrolyte, includes an electrocatalytically active material. The electrocatalyst is catalytically active toward the reduction of oxidant but is catalytically passive toward the oxidation of alcohol. A preferred suitable material meeting all of the above criteria is a porous carbon mass. This material is recognized to selectively catalyze the reduction of oxygen while remaining passive toward alcohol. Other catalysts are, of course, known which are selective to the reduction of oxygen. Spinels and silver are such materials. Although the cathode may be constructed without the addition of wetproofing materials, in the preferred form wetproofing material is distributed throughout the conductive mass.

A portion of the cathode can be covered with an impervious mask. The mask may be formed of any material which is impervious to oxidant as well as fuel and electrolyte. In the configuration shown in the single FIGURE of the drawing, the function of the mask is to avoid contact of oxidant with fuel and electrolyte on the surface of the conductive mass, except at the intended electrolyte interface. Specific examples of masking materials include impervious metal coatings as well as coatings of alkali and methanol impervious nonmetals, such as waxes, rubbers, and resins. The mask is preferably applied in the form of an adhesive coating. Wax has been found to be an easily applied, low-cost masking material of suitable stability. Cathodes of the above configuration which are both masked and wetproofed perform better than corresponding electrodes lacking either masking, wetproofing, or both. Masking of the above type of cathode is undertaken to slow alcohol evaporation from a cell, as will be more fully explained below.

To replenish the oxygen consumed at the cathode-electrolyte interface, air must diffuse through the porous, electronically conductive cathode. In the configuration shown in the single FIGURE of the drawing, impervious mask 20 is provided to limit the interface of the electrolyte and porous conductive mass to the portion 21 facing the anode electrode. Thus, alcohol diffusing from the restricted interface to the upper end of the porous cathodes is provided with a relatively long diffusion path. The rate of alcohol diffusion is thus significantly curtailed over a prolonged time period. If one or more cathodes are utilized as a portion of the casing, no masking is required.

It is preferred to impregnate and cover with at least one thickening agent at least a portion of the gas diffusion electrode, for example in the single FIGURE of the drawing, the exposed or unmasked portion of the above-described cathode. Additionally, at least a portion of the interior surfaces of both the body portion and the cover of the cell casing can be covered with a layer of the thickening agent. Similarly, a layer of the thickening agent can be applied to at least a portion of one of the surfaces of the anode electrode. The water-soluble polymeric thickening agent is mixed initially with a solvent such as water and stirred, if desired, to form a mucilage or a viscous solution. This solution is then applied in any suitable manner to the desired portions of the cathode electrode, the anode electrode, and the interior of both the body portion and the cover of the cell casing.

Subsequently, the water solvent is allowed to evaporate from the solution thereby forming a layer of a thickening agent impregnated into, if the structure is porous, and covering the portion of the contacted structure. In addition to the above component parts of an electrochemical cell, the thickening agent can be applied in the same manner to other types of substrates thereby forming a composite article with a substrate and a layer of the thickening agent adhering to and covering at least a portion of the substrate.

We found that the polymeric thickening agent of our invention must be water soluble, swellable in an aqueous electrolyte, but not dissolvable in the same electrolyte. The thickening agent must adhere to and cover the portion of the substrate on which it is applied as a layer or film.

Suitable thickening agents which have the above properties and can be employed in the practice of our invention and are swellable in an aqueous alkaline electrolyte include the polymers of acrylic acid, carboxy polymethylene, carboxymethyl cellulose, methyl cellulose, algin, polyethylene oxide, polyvinyl alcohol, and mixtures thereof. Suitable thickening agents which can be employed in the practice of our invention and are swellable in an aqueous acid electrolyte include the polymers of acrylic acid, carboxy polymethylene, algin, pectin, polyvinyl alcohol, carboxymethyl cellulose, and mixtures thereof.

In an illustrative operation of the cell shown in the single FIGURE of the drawing, portion 21 of cathode 15, anode 17, and the interior surfaces of body portion 12 and cover portion 13 of casing 11 have applied thereto a thickening agent formed by mixing together at least one water-soluble polymeric thickening agent swellable in an aqueous electrolyte and a water solvent. After the above portions of the cell have dried, an electrolyte of potassium hydroxide and methyl alcohol is poured into chamber 14 of casing 11. Generally, these solutions are added to a level beneath the open top of body portion 13. Cover 13 is fitted functionally at the upper open end of body portion 12. The thickening agent swells in the electrolyte immobilizing substantially the electrolyte and dissolved fuel. Leads 18 and 19 are connected to a suitable electrical load (not shown) and electrical energy is generated from the cell. When the fuel in the form of the methyl alcohol has become sufficiently depleted, cover 13 can be removed, the thickening solution in chamber 14 removed, and additional potassium hydroxide and methyl alcohol added to chamber 14. The cell can be recovered and operated.

Examples of composite articles, composite gas diffusion electrodes and electrochemical cells made in accordance with our invention are set forth below:

EXAMPLE 1

A porous carbon block, which is commercially available and is commonly used as a gas diffusion electrode in an electrochemical cell, was used to provide a substrate for the improved composite gas diffusion electrode of our invention. 2.5 weight percent of carboxy polymethylene polymer, a water-soluble polymeric thickening agent, was added to water and stirred to form a mucilage or viscous solution. This solution was painted on one of the opposite larger surfaces of the carbon block. The coated substrate was then allowed to dry in air whereby the water solvent evaporated. After drying, a second coating was applied and dried to prevent pinholes or flaws from extending through the coatings. The resulting structure was a composite gas diffusion electrode in which the carbon block substrate had a layer of thickening agent impregnated in and covering the surface of the block which had been contacted by the viscous solution.

EXAMPLE 2

A porous nickel cup had an identical initial coating applied to its exterior surface as described above in example 1. After drying, a second coating was applied and dried to prevent pinholes or flaws from extending through the coatings. The resulting structure was a composite article of a porous nickel substrate and a thickening agent impregnated in and covering the exterior surface which had been contacted with the viscous solution.

EXAMPLE 3

A porous carbon cup had an identical initial coating applied to its exterior surface as described above in example 1. After drying, a second coating was applied and dried to prevent pinholes or flaws from extending through the coatings. The resulting structure was a composite article of a porous carbon substrate and a thickening agent impregnated in and covering the exterior surface which had been contacted with the viscous solution.

EXAMPLE 4

An electrochemical cell of the type shown in the single FIGURE of the drawing was used in this example. The body portion and cover of the casing were made of polypropylene. A viscous solution was formed as described above in example 1 and applied to the interior surface of the body portion and the interior surface of the cover of the casing. A porous carbon cathode having a wax mask and an exposed surface as shown in the drawing had its exposed surface covered in the same manner with the same viscous solution. A methanol anode of platinum-palladium on a porous nickel substrate as shown in the above drawing was also covered with the viscous solution. The cell with its components was allowed to dry, whereupon the resultant structure had a layer of thickening agent impregnated in and covering the former exposed portion of the cathode, impregnated in and covering the exterior surface of the anode, and covering the interior of both the body portion and cover portion of the casing.

EXAMPLE 5

A porous carbon cathode as shown in the drawing and masked substantially with wax had its exposed portion coated with the above type of viscous solution set forth in example 1. After the water evaporated, there was a layer of the thickening agent impregnated in and covering the exposed portion of the cathode. This cathode was employed in a cell of the type shown in the single FIGURE in which a potassium hydroxide electrolyte, a methyl alcohol fuel and a methanol anode of platinum-ruthenium on a porous nickel substrate were used. The cell was placed under resistive electrical load for a period of 300 hours. During operation there was no visible wetting of the air exposed surface of the cathode.

EXAMPLE 6

The coated nickel cup described above in example 2 was employed as the cathode in an electrochemical cell as shown in the drawing, which also used a methanol anode of platinum-palladium on a porous nickel substrate, a potassium hydroxide electrolyte, and a methyl alcohol fuel. The cell was placed under load and operated for a period of 24 hours during which time its performance improved. The load was then removed. During the operation of the cell, no wetting was visible on the air-exposed surface of the cathode and no electrolyte appeared to have penetrated through the cathode electrode.

EXAMPLE 7

The cell which is described above in example 4 had a potassium hydroxide electrolyte, and methyl alcohol fuel placed in the cell after which its cover was fitted functionally thereon and the cell was operated. During 100 hours of operation there was no visible wetting through the cathode and no leakage of electrolyte or alcohol from the casing.

EXAMPLE 8

A porous nickel cup had a layer of thickening agent formed thereon as described above in example 1. The coated nickel cup was then employed as the cathode in an electrochemical cell as shown in the drawing which used also a methanol anode of platinum-palladium on a porous nickel substrate and a 13 normal potassium hydroxide electrolyte containing 6 molar methanol. The cell was placed under load and after 100 hours of operation at a current of 8.8 to 9.0 milliamperes, no wetting was visible on the air-exposed surface of the cathode and no electrolyte appeared to have penetrated through the cathode electrode.

EXAMPLE 9

A porous nickel cup containing 3.3 weight percent polyethylene added as a wetproofing agent had a layer of thickening agent formed thereon as described above in example 1. The coated nickel cup was then employed as the cathode in an electrochemical cell as shown in the drawing which used also a methanol anode of platinum-palladium on a porous nickel substrate and a 13 normal potassium hydroxide electrolyte containing 6 molar methanol. After 170 hours on open circuit, no wetting was visible on the air-exposed surface of the cathode and no electrolyte appeared to have penetrated through the cathode electrode.

EXAMPLE 10

A porous carbon cup containing 10 weight percent polyethylene added as a wetproofing agent had a layer of thickening agent formed thereon as described above in example 1. The coated porous carbon cup was then employed as the cathode in the type of cell described above in example 8. The cell was placed under load and operated. After a period of 300 hours of operation, no wetting was visible on the air-exposed surface of the cathode and no electrolyte appeared to have penetrated through the cathode electrode.

EXAMPLES 11-18

In examples 11-18, various water-soluble polymeric thickening agents were added to water and stirred to form a mucilage or viscous solution. Each of the solutions was then painted as about a ⅛-inch layer on one surface of a separate glass slide and allowed to dry by evaporation of the water solvent. A layer of thickening agent adhered to and covered the one surface of the slide on which the viscous solution had been applied.

Each of the glass slides was positioned in a separate beaker in contact with a solution of 6 molar methanol and 13 normal potassium hydroxide. The layer of thickening agent became swollen when immersed in the potassium hydroxide but did not dissolve therein. The glass slides from examples 11-14 with the respective swollen thickening agents thereon were each kept in the above solutions for a period of 100 hours while the slides from examples 15-18 were kept in the above solutions for a period of 24 hours. In table I below there are set forth the particular thickening agents employed and the weight percent of the thickening agent employed for each of the examples 11-18.

TABLE I

| Example No. | Thickening Agent | Weight Percent |
| --- | --- | --- |
| 11 | Carboxy polymethylene | 1.5 |
| 12 | Methyl cellulose | 3.0 |
| 13 | Algin | 3.0 |
| 14 | Polyethylene oxide | 1.5 |
| 15 | Polyvinyl alcohol | 10.0 |
| 16 | Carboxy polymethylene, | 1.5 |
|  | Polyvinyl alcohol | 1.5 |
| 17 | Carboxymethyl cellulose | 1.5 |
| 18 | Polyvinyl alcohol | 5.0 |

EXAMPLES 19-24

In examples 19-24, various water-soluble polymeric thickening agents were prepared as set forth above in examples 11-18 to provide layers on individual glass slides. The same procedure for testing these thickening agents was employed as in above examples 11-18 except that the solutions in the beakers were 6 normal sulfuric acid. In a similar manner, each of the thickening agents swelled in the electrolyte solution. After 100 hours, the slides from examples 19-21 with the respective swollen thickening agents thereon were removed from the solutions. After 24 hours, the slides from examples 22-24 with the respective swollen thickening agents thereon were removed from the solutions. In table II below there is set forth the type of thickening agent and the weight percent of thickening agent used.

TABLE II

| Example No. | Thickening Agent | Weight Percent |
| --- | --- | --- |
| 19 | Carboxy polymethylene | 1.5 |
| 20 | Algin | 3.0 |
| 21 | Pectin | 3.0 |
| 22 | Carboxy polymethylene | 1.5 |
|  | Polyvinyl alcohol | 1.5 |
| 23 | Carboxymethyl cellulose | 1.5 |
| 24 | Polyvinyl alcohol | 5.0 |

While other modifications of the invention and variations thereof which may be employed within the scope of the invention have not been described, the invention is intended to include such as may be embraced within the following claims:

What we claim as new and desire to secure by Letters Patent of the United States is:

1. A composite electrode comprising a porous substrate, a portion of the exterior surface of the substrate exposed for gas diffusion therethrough, at least one water-soluble polymeric thickening agent swellable in an aqueous electrolyte, a layer of the thickening agent adhering to and covering a portion of the same surface of the substrate, and a liquid and gas impervious mask substantially covering the remaining portion of the same surface of the substrate.

2. In a composite electrode as in claim 1, wherein the substrate is porous carbon.

3. In a composite electrode as in claim 1, wherein the substrate is porous nickel.

4. In an electrochemical cell comprising a casing, at least one gas diffusion electrode positioned in the casing, and at least one other electrode positioned in the casing and spaced from the gas diffusion electrode, the improvement comprising the gas diffusion electrode being a composite electrode which comprises a porous electrode body, a portion of the exterior surface of the body exposed for gas diffusion therethrough, at least one water-soluble polymeric thickening agent swellable in an aqueous electrolyte, a layer of the thickening agent adhering to and covering a portion of the same surface of one of the electrode bodies, and a liquid and gas impervious mask substantially covering the remaining portion of the same surface of the body.

5. In a cell as in claim 4, wherein two gas diffusion electrodes are employed, and both of the gas diffusion electrodes are composite electrodes.

6. In a cell as in claim 4, wherein a layer of the thickening agent adheres to and covers at least a portion of the interior surface of the casing.

* * * * *